United States Patent [19]

Cook

[11] 4,212,381

[45] Jul. 15, 1980

[54] ANTI-RUNOUT DEVICE AND CONVEYOR APPARATUS

[76] Inventor: Martin E. Cook, 10025 Stoll Rd., Haslett, Mich. 48840

[21] Appl. No.: 12,379

[22] Filed: Feb. 15, 1979

[51] Int. Cl.² ............................................. B65F 11/00
[52] U.S. Cl. ....................................... 193/40; 221/295
[58] Field of Search ................... 198/491, 492; 193/32, 193/35 A, 40; 221/289, 290, 294, 295, 298; 188/207, 250 R

[56] References Cited

U.S. PATENT DOCUMENTS

| 2,979,177 | 4/1961 | Sullivan | 193/40 |
| 3,108,671 | 10/1963 | Fuka et al. | 193/35 A |
| 3,917,044 | 11/1975 | Brown | 193/40 |

*Primary Examiner*—Robert B. Reeves
*Assistant Examiner*—Gene A. Church
*Attorney, Agent, or Firm*—Ian C. McLeod

[57] ABSTRACT

An anti-runout device adapted to be mounted below the running surface or pass line of an inclined lane, gravity feed package conveyor and upstream from a package release mechanism at the discharge end of the conveyor is described. The device acts as a brake means to slow or stop the packages and includes a brake shoe mounted on a lifter means. The lifter means is moveably supported in a guide means for linear movement of the brake shoe and the lifter means. The shoe and the lifter means are mounted such that the shoe can move well above the running surface of the inclined lane to reach and to lift a package which can be moving rapidly enough to be substantially above and thus out of contact with the running surface of the conveyor.

14 Claims, 9 Drawing Figures

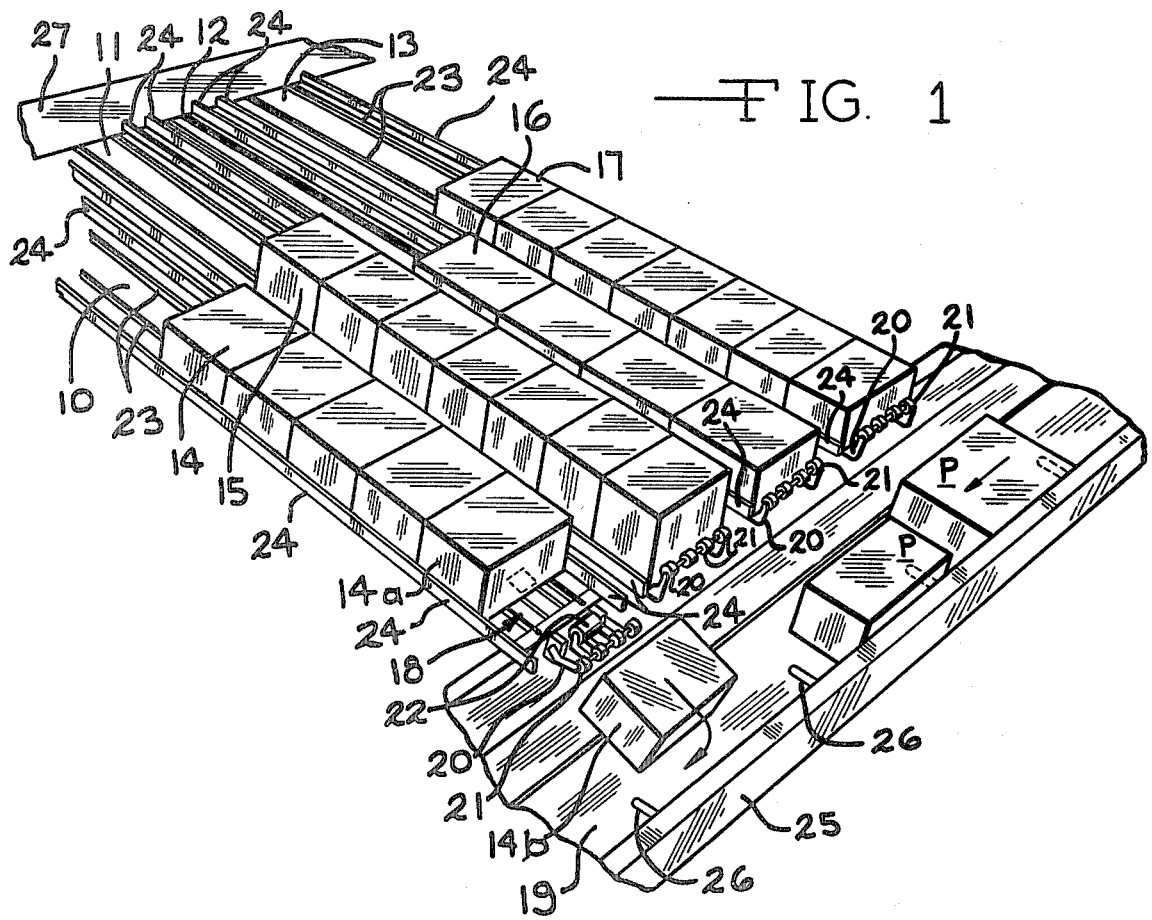
FIG. 1
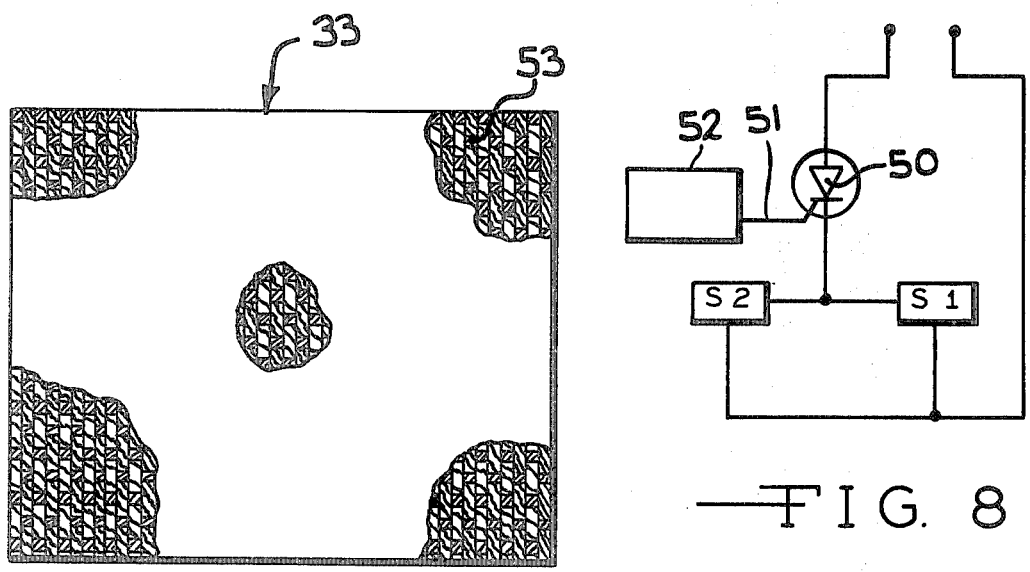
FIG. 9
FIG. 8

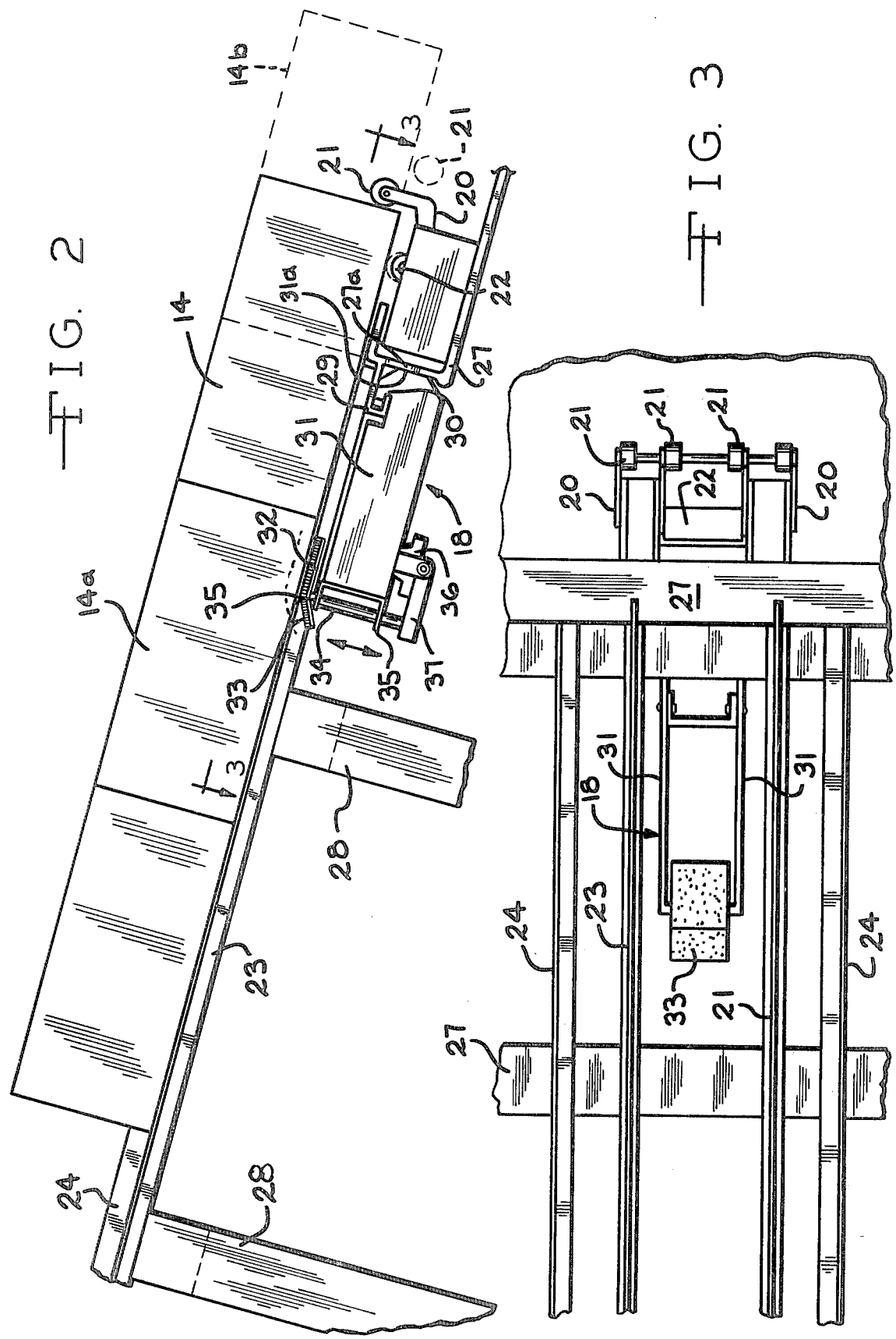

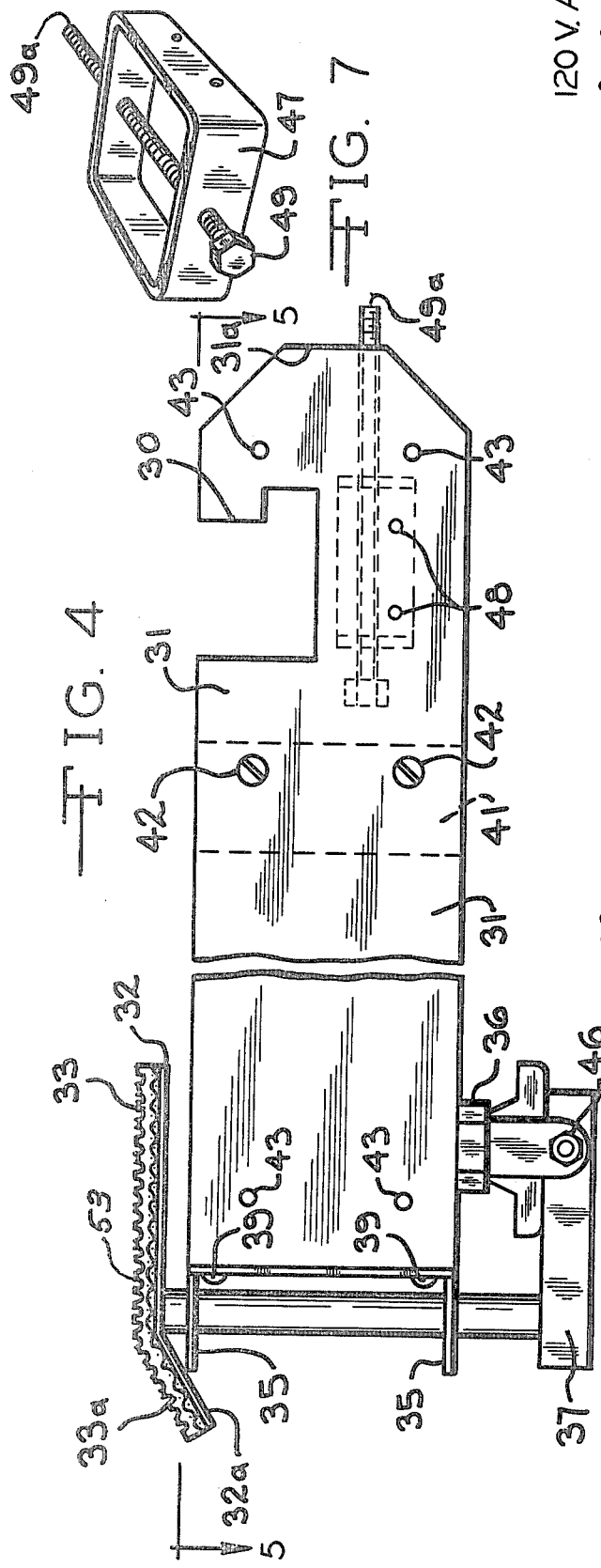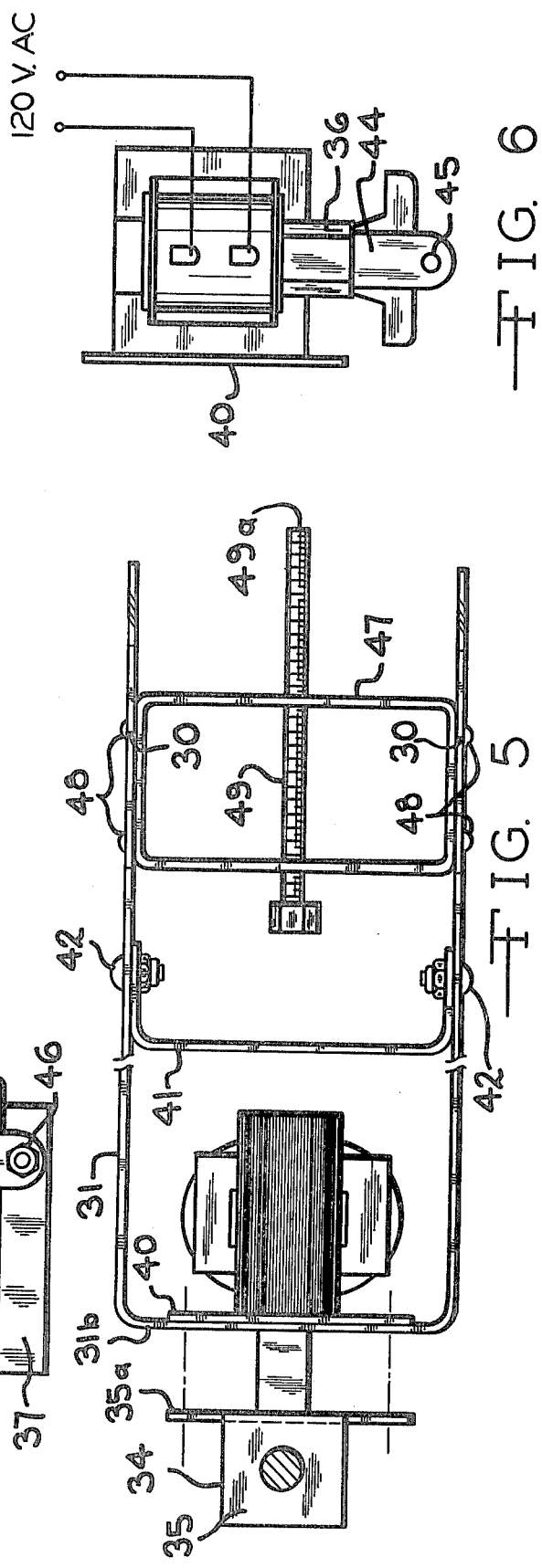

ANTI-RUNOUT DEVICE AND CONVEYOR APPARATUS

SUMMARY OF THE INVENTION

The present invention relates to an anti-runout device for use as a brake means preceding a release mechanism at the discharge end of an inclined lane, gravity feed conveyor. The present invention particularly relates to a device which has a brake shoe mounted on a lifter means such that the shoe is linearly moveable substantially above the lane so as to be able to stop or slow a rapidly moving package which can be well above and out of contact with the running surface or pass line of the lane.

PRIOR ART

Inclined lane, gravity feed conveyors are usually equipped with a release mechanism or gate at the end of the conveyor lane which is opened and closed by control means and thus releases a certain number of packages from the conveyor in succession. These conveyors are usually of the rail type. Illustrative of the release mechanisms are the devices shown in U.S. Pat. Nos. 3,819,023 to McClelland and 3,917,044 to Brown. The problem is that the momentum of numerous heavy packages moving in a line down the inclined lane at high speed, for instance in a large warehouse operation, can be sufficient to break, unlock or prevent the closing of the gate, causing the packages to run out off the lane in an uncontrolled manner. This "runout" causes damage to packages as well as a substantial risk that an operator can be injured.

As a result of the problem with runout, "anti-runout" devices have been developed by the prior art in an attempt to stop or slow a preceding, usually a second, in line package and thus provide a spaced flow. Such devices are shown, for instance, in U.S. Pat. Nos. 3,250,361 to Bystedt, 3,917,044 to Brown and 4,000,796 to Bolton et al. The problem with these prior art devices is that the brake surface does not react fast enough and/or does not move high enough to effectively reach moving packages which can be substantially above the running surface of the inclined lane.

OBJECTS

It is therefore an object of the present invention to provide an anti-runout device which prevents damage to and provides precision operation of the gate or release mechanism at the end of an inclined lane. It is further an object of the present invention to provide a fast acting anti-runout device or brake means which is adapted to quickly slow or stop a package preceding the first in line package at the gate, even if the moving package is well above the running surface of the inclined lane. These and other objects will become increasingly apparent by reference to the following description and the drawings.

IN THE DRAWINGS

FIG. 1 is a front perspective view of multiple side-by-side inclined, gravity feed, runner or rail type conveyors which feed to a common or single second belt type conveyor and particularly illustrating in broken lines in the foremost lane the mounting of the brake shoe of the anti-runout device of the present invention behind an open release mechanism or gate.

FIG. 2 is a front cross-sectional view of a package filled conveyor lane, such as shown in FIG. 1, particularly illustrating the mounting of the anti-runout device of the present invention below the running surface of the inclined lane of the conveyor and also illustrating in broken lines the open position of the release mechanism and the extended position of the brake shoe pushing against the underside of a second in line package as a first in line package is removed from the conveyor lane.

FIG. 3 is a top view along line 3—3 of FIG. 2, also showing the positioning of the anti-runout device in the conveyor lane.

FIG. 4 is a front view of the preferred anti-runout device of the present invention as a unit particularly illustrating the details of construction of the brake shoe, the lifter means, guide means for the lifter and the housing.

FIG. 5 is a top view along line 5—5 of FIG. 4 showing the positioning of a solenoid mounted in the housing for moving the lifter means.

FIG. 6 is a front view of the solenoid shown in FIGS. 4 and 5 separated from the housing.

FIG. 7 is a front perspective view of a preferred means for adjusting the vertical position of the anti-runout device when it is installed on a rail type conveyor sheet as shown in FIG. 1.

FIG. 8 is a schematic electrical diagram illustrating two solenoids $S_1$ and $S_2$ one of which opens the gate while the other simultaneously lifts the brake shoe to engage, lift and thus slow or stop a preceding package.

FIG. 9 is a plan view of a preferred package engaging surfaces of the brake shoe showing multiple projections for gripping the undersides of packages.

GENERAL DESCRIPTION

The present invention relates to a conveyor apparatus including means defining an inclined lane and a discharge end along which packages are to be conveyed by gravity for singular discharge at the end, means defining a support for the lane, a release mechanism at the discharge end of said lane, the release mechanism being moveable from a package blocking position to a package release position for a first in line package, a brake means positioned upstream from the release mechanism for retarding movement of a second in line package in the lane when the release mechanism is in its release position, the improvement in the brake means which comprises: a brake shoe wherein one side of the shoe is mounted on a lifter means and wherein an opposite side of the shoe is a brake surface; guide means mounted on the support means adapted for supported movement of the lifter means such that the shoe is linearly moveable substantially above the lane for contact by the brake surface of the shoe with an underside of a second in line package moving along the rails towards the release mechanism to lift the package; and means for rapidly moving the lifter means such that the brake surface of the shoe engages the underside of and lifts the second in line package in response to the release mechanism being in the release position. Unexpectedly it has been found that if the runout device can actually lift the package slightly, even when it is out of contact with the lane because of high speed movement, it can be stopped or slowed sufficiently for controlled flow.

Preferably the conveyor apparatus is of the type which has runners or rails defining the lane or pass line which supports the packages. Also it is preferred that the lifter means and brake shoe move substantially perpendicularly to the lane.

The present invention also relates to the anti-runout device or brake means adapted to prevent runout in a package conveyor apparatus which comprises: a housing; a brake shoe projecting from the housing and mounted on a lifter means which is supported in a guide means on the housing such that the shoe is linearly moveable for contact of a surface of the shoe with an underside of a package to lift the package when the brake means is mounted in a conveyor lane; actuating means mounted on the housing for rapid powered linear movement of the lifter means in the guide means to move the shoe; and means for mounting the housing on the apparatus so as to engage and lift a package to prevent runout. The actuating means is preferably a solenoid. The device is preferably easily removeable from the conveyor for replacement.

SPECIFIC DESCRIPTION

FIGS. 1 to 3 show a preferred apparatus including multiple rail type conveyors 10, 11, 12 and 13 carrying multiple packages or packing cases 14, 15, 16 and 17 of varying sizes. The anti-runout device 18 is shown mounted on the conveyor 13 holding a second in line package 14a in position while a first in line package 14b is released onto a conventional belt conveyor 19 running in a direction perpendicular to the line of flow or pass line of the rail conveyors 10, 11, 12 and 13. A conventional release mechanism or gate 20 with stops 21 is provided in each lane of the conveyors 10, 11, 12 and 13. The stops 21 in lane 10 are shown in the open position by dotted lines in FIG. 2. A roller 22 on the gate 20 assists the packages 14 from the runners 23 by providing a rolling surface for package 14b. The packages 14 are held in line by L shaped rails 24 on opposite sides of the packages 14, 15, 16 and 17. A stop rail 25 on the belt conveyor 19 and projections 26 on the conveyor 19 position and move the packages 14b and other packages P on the belt conveyor 19.

The rails 24, anti-runout device 18 and release mechanism 20 are supported on a frame 27 with legs 28. The anti-runout device 18 is removeably supported in a cantilevered manner by a U or hook shaped channel 29 portion of the frame 27 and by a hooked portion 30 of a housing 31 of the anti-runout device 18. A flat portion 31a of the housing 31 abuts on an upright portion 27a of the frame 27, thus locking the housing 31 in position in relation to a downward force on the housing 31. A brake shoe 32 with a high friction braking surface 33 is mounted on a lifter rod 34 slideably supported by a guide 35. The lifter rod 34 is actuated by means of a solenoid 36 which moves an arm 37 attached to the lifter rod 34.

As can be seen best from FIGS. 4, 5 and 6 showing the anti-runout device as a unit, the housing 31 has an end 31b to which a plate 35a forming part of the guide 35 is attached by bolts 39. On the opposite side of the end 31b, a second plate 40 which supports the solenoid 36 is attached by the bolts 39. The housing 31 has a second mounting plate 41 secured to the housing 31 by means of bolts 42. The plates 35a and solenoid plate 40 can be moved along the housing 31 to the second plate 41 to accommodate packages of varying lengths. Preferably where the package size is small, the distance from the gate 20 is up to about 8½ inches (21.6 cm), medium about 11½ to 12 inches (29.2 to 30.5 cm) and large about 18 to 20 inches (45.7 to 50.8 cm) such that the package 14, 15, 16 or 17 is contacted between midway and the front of the package 14a in the second in line position in each lane. As will be recognized, additional mounting plates (not shown) like the plate 41 can be used in varying positions along the housing 31. The holes 43 can be used for mounting the housing 31 on the frame 27 in instances where a channel 29 on the frame 27 is not present or is inaccessible. The solenoid 36 has an arm 44 with a hole 45 for bolt 46 which holds arm 37 in place. The solenoid 36 is preferably powered at 120 VAC so that it can lift a heavy package 14.

In the anti-runout device of FIGS. 4 to 7, a small box shaped member 47 is mounted by nuts and bolts 48 on housing 31 adjacent end 31a. A bolt 49 is threaded through sides of the member 47, such that it is essentially perpendicular to end 31a. In this manner, the upward vertical positioning of the housing 31 on the conveyor can be changed to a limited extent by moving the end 49a of the bolt 49 towards the upright portion 27a of the frame member 27.

As shown in FIG. 8, the anti-runout device solenoid $S_1$, such as solenoid 36 and a solenoid for the gate mechanism $S_2$ are both controlled by a single silicon controlled rectifier 50 having an electrical gate 51 which acts as a switch to allow the flow of current through the rectifier 50. In this manner, the release mechanism 20 is opened simultaneously with the upward movement of the brake shoe 32 such as shown in FIG. 2. The gate 50 can be connected to a control means 52 with a counting unit such as a computer (not shown).

FIG. 9 shows the preferred brake shoe surface 33 with projections or fingers 53 in a checkerboard pattern which can engage the undersides of the packages 14. This surface 33 is preferably made of rubber for cardboard packages. The shoe 32 and surface 33 both have an inclined ramp 32a and 33a towards the direction of flow of the packages 14 which prevents the shoe 32 or surface 33 from locking on a leading edge of a package 14.

In operation, the packages are fed by gravity down the runners 23 and are in line with the front package 14 held in position by the closed release mechanism 20. The release mechanism solenoid $S_2$ and the anti-runout solenoid $S_1$, are operated simultaneously such that the package 14b leaves the conveyor 10 and the second in line package 14a is held in position by surface 33 of the shoe 32. Even when the conveyor is operating at very high feed rates, the shoe 32 and lifter 34 can reach up to contact and to lift a second in line package which can be moving up to about 1 inch (2.54 cm) above the runners 23. The packages 14 can be moving so fast that the solenoid 36 operates in one second or less intervals. The anti-runout device provides for positive control of the packages 14.

It will be appreciated that rollers (not shown) or other types of inclined conveyor running surfaces can be used to define a pass line for gravity feed. Other actuating means besides a solenoid such as cams or the like (not shown) can be used to move the lifter means. Also a single solenoid could be coupled to the gate mechanism and to the brake means and both could be built into the conveyor rather than being a replaceable unit. Also it will be appreciated that the anti-runout device can be mounted on other types of conveyors which are powered; however, there is less need for them in powered roller conveyors. All of these variations will be obvious to one skilled in the art.

I claim:

1. In a conveyor apparatus including means defining an inclined lane and a discharge end along which packages are to be conveyed by gravity for singular discharge at the end, means defining a support for the lane, a release mechanism at the discharge end of said lane, the release mechanism being moveable from a package blocking position to a package release position for a first in line package, a brake means positioned upstream from the release mechanism for retarding movement of a second in line package in the lane when the release mechanism is in its release position, the improvement in the brake means which comprises:
   (a) a brake shoe wherein one side of the shoe is mounted on a lifter means and wherein an opposite side of the shoe is a brake surface;
   (b) guide means mounted on the support means adapted for supported movement of the lifter means such that the shoe is linearly moveable substantially above the lane for contact by the brake surface of the shoe with an underside of a second in line package which can be moving out of contact with and above the lane towards the release mechanism to lift the package; and
   (c) means for moving the lifter means such that the brake surface of the shoe engages the underside of and lifts the second in line package in response to the release mechanism being in the release position.

2. The apparatus of claim 1 wherein the inclined lane includes at least two runners for the packages.

3. In a conveyor apparatus including means defining an inclined lane as a flow path having sides and a discharge end along which packages are to be conveyed by gravity for singular discharge at the end, the lane including at least two runners for support of packages moving down the inclined lane, means defining a support for the runners, a release mechanism at the discharge end of said lane, the release mechanism being moveable from a package blocking position to a package release position for a first in line package, a brake means positioned upstream from the release mechanism for retarding movement of a second in line package in the lane when the release mechanism is in its release position, the improvement in the brake means which comprises:
   (a) a housing mounted below the runners and the flow path of the packages on the support means for the runners;
   (b) a brake shoe projecting from the housing mounted on a lifter means which is supported in a guide means on the housing such that the shoe is linearly moveable substantially perpendicularly to and above the lane for contact by a surface of the shoe with an underside of a second in line package which can be moving out of contact with and above the runners towards the release mechanism to lift the package;
   (c) solenoid means mounted in the housing and connected to the lifter means for powered linear movement of the shoe to engage and lift a second in line package; and
   (d) electrical control means for actuating the solenoid means, whereby when the release mechanism is activated to the release position for removal of a first in line package, the brake shoe is moved by the solenoid such that the surface contacts the underside of a second in line package to lift the package.

4. The apparatus of claim 3 wherein the release mechanism is actuated separately by a solenoid to the release position.

5. The apparatus of claim 3 wherein the surface of the brake shoe is lined with a high friction material for engaging the second in line package.

6. The apparatus of claim 5 wherein the surface material is rubber.

7. The apparatus of claim 5 wherein the surface has a tread with projections in a checkerboard pattern.

8. The apparatus of claim 3 wherein the release mechanism is actuated separately by a solenoid and wherein the brake shoe solenoid and the release mechanism solenoid are actuated by a common electrical control means.

9. The apparatus of claim 8 wherein the control means is a silicon controlled rectifier with an electrical gate as a switch which is activated by a counting unit for the packages.

10. A brake means adapted to prevent runout in a package conveyor apparatus defining a lane for supporting packages which comprises:
    (a) a housing adapted for mounting on a conveyor apparatus adjacent to a gate release mechanism at a package release end;
    (b) a brake shoe projecting from the housing and mounted on a lifter means which is supported in a guide means on the housing such that the shoe is linearly moveable substantially above the lane for contact of a surface of the shoe with an underside of a second in line package which can be moving out of contact with and above a conveyor lane to lift the package when the brake means is mounted in the conveyor lane;
    (c) solenoid means mounted on the housing and connected to the lifter means for powered linear movement of the lifter means in the guide means to move the shoe into contact with the second in line package; and
    (d) means for mounting the housing on the apparatus so as to engage and lift a second in line package to prevent runout.

11. The brake means of claim 10 wherein the surface of the brake shoe is lined with a high friction material adapted for engaging the underside of and to then slow or stop a moving package.

12. The brake means of claim 11 wherein the surface is rubber.

13. The brake means of claim 11 wherein the surface has a tread with projections in a checkerboard pattern.

14. A brake means adapted to prevent runout in a package conveyor apparatus defining a lane for supporting packages which comprises:
    (a) a housing adapted for mounting on a conveyor apparatus adjacent to a gate release mechanism at a package release end;
    (b) a brake shoe projecting from the housing and mounted on a lifter means which is supported in a guide means on the housing such that the shoe is linearly moveable substantially above the lane for contact of a surface of the shoe with an underside of a package which can be moving out of contact with and above a conveyor lane of the apparatus to lift the package when the brake means is mounted in the conveyor lane;
    (c) actuating means mounted on the housing for rapid powered linear movement of the lifter means in the guide means to move the shoe into contact with the underside of the package; and
    (d) means for mounting the housing on the apparatus so as to engage a moving package to prevent runout.

* * * * *